UNITED STATES PATENT OFFICE 2,486,370

COPOLYMERS OF ISOPROPENYL ACETATE AND FUMARIC OR MALEIC ESTER-AMIDES

William O. Kenyon and Cornelius C. Unruh, Rochester, N. Y., assignors to Eastman Kodak Company, Rochester, N. Y., a corporation of New Jersey No Drawing. Application August 13, 1947, Serial No. 768,513

8 Claims. (Cl. 260—78)

This invention relates to copolymers of isopropenyl acetate and fumaric or maleic ester-amides.

In our copending application Serial No. 495,888, filed July 23, 1943 (now United States Patent 2,448,531, dated September 7, 1948), we have showed that although isopropenyl acetate cannot be homopolymerized to give a high molecular weight resinous homopolymer, it can be copolymerized with one or more esters of fumaric or maleic acid to give very useful resinous copolymers. We have now found that isopropenyl acetate can be copolymerized with fumaric or maleic ester-amides to give useful resinous copolymers.

It is, accordingly, an object of our invention to provide new resinous copolymers. A further object is to provide a process for preparing such copolymers. Other objects will become apparent hereinafter.

In accordance with our invention, we copolymerize isopropenyl acetate with at least one ester-amide of one of the following general formulas:

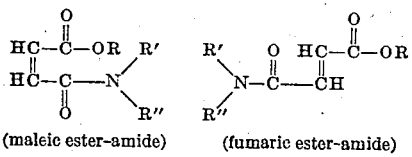

(maleic ester-amide)    (fumaric ester-amide)

wherein R represents a radical of a monohydric alcohol, and R' and R'' each represents a member selected from the group consisting of hydrogen and a radical of a monohydric alcohol. Isopropenyl acetate can be represented by the following formula:

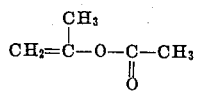

The copolymerization of isopropenyl acetate with the ester-amides is accelerated by heat, and by the polymerization catalysts which are known to accelerate the polymerization of vinyl and acrylic compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates).

The copolymerization can be effected with or without a diluent. The diluent, if employed, is advantageously a solvent for the copolymer. The monomers can also be emulsified in a liquid in which they are insoluble (e. g. water) and the emulsion subjected to polymerization. The monomers can also be suspended in water using relatively poor dispersing agents, such as starch, and polymerized in the form of granules. The proportions of isopropenyl acetate and the ester-amide in the polymerization mixtures can be varied widely and still give copolymers in which the molar ratio of isopropenyl acetate to the ester-amide is substantially 1:1. While the polymerization mixtures containing from 1 to 9 parts by weight of isopropenyl acetate to from 9 to 1 parts by weight of the ester-amide give good copolymers in 1:1 ratio, the most satisfactory process and the best copolymers are obtained with polymerization mixtures containing from 1 to 3 parts by weight of isopropenyl acetate to 1 part by weight of the ester-amide.

The ester-amides in which R in the above formulas represents an alkyl group of the formula $C_nH_{2n+1}$ wherein $n$ represents a positive integer of from one to four, and in which R' and R'' represents hydrogen or an alkyl group of the formula $C_nH_{2n+1}$ wherein $n$ represents a positive integer of from 1 to 4, give copolymers of particular utility for molding purposes.

Not only ester-amides in which the aforesaid alcohol radicals are $C_nH_{2n+1}$ groups wherein $n$ represents a positive integer, can be used, but also ester-amides containing substituted alcohol radicals, unsaturated alcohol radicals, e. g. allyl, β-chlorethyl, β-ethoxyethyl, can also be used.

The following examples will serve to illustrate our new resinous copolymers and the manner of obtaining the same.

*Example 1.—Copolymer of isopropenyl acetate and ethyl fumaramate*

(a) 5 parts by weight of isopropenyl acetate, 7.2 parts by weight of ethyl fumaramate, 0.06 part by weight of benzoyl peroxide and 20 parts by volume of dry dioxane were sealed together in a glass ampoule and placed in a 50° C. constant temperature bath. A clear, colorless solution formed after a few minutes, and after 24 hours it had changed to a clear, colorless viscous mass. After another 48 hours, the product was thinned with dioxane containing 10 per cent of water, and the diluted solution poured into an excess of methanol. The white precipitate thus obtained was redissolved in a dioxane-water mixture and reprecipitated into methanol. The yield was 11 parts of a white polymer. Analysis for nitrogen indicated that the molar ratio of isopropenyl acetate to ethyl fumaramate in the copolymer was 1:1.02.

(b) 5 parts by weight of isopropenyl acetate, 7.2 parts by weight of ethyl fumaramate and 0.05 part by weight of benzoyl peroxide were sealed in a glass ampoule and placed in a steam bath. In a short while, the solution had become homogeneous, and within 15 minutes had changed to a very viscous, yellow colored mass, which hardened at the end of 2 hours. The mass was dissolved in dioxane containing 10 per cent of water and the solution poured into an excess of agitated methanol. This was dissolved in wet dioxane and reprecipitated in methanol and dried at 50° C. The yield of polymer was 9.5 parts. Analysis for nitrogen indicated that the molar ratio of isopropenyl acetate to ethyl fumaramate in the copolymer was 1:0.97.

*Example 2.—Copolymer of isopropenyl acetate and N-butyl ethyl fumaramate*

5.0 grams of isopropenyl acetate, 10.0 grams of N-butyl ethyl fumaramate and 0.15 gram of benzoyl peroxide were sealed together in a glass tube and placed in a 50° C. bath. After heating in the bath at this temperature for a period of 10 days, the contents of the tube had changed to a clear, hard and slightly yellow colored resin, which was soluble in acetone. The unchanged monomers were removed by dissolving the resin in acetone, filtering the solution and reprecipitating into an excess of boiling hydrocarbon fraction having a boiling range of 105° to 156° F. The purification step was repeated once more, the resin being dried under vacuum. This was followed by dissolving the precipitate a third time in acetone and pouring the solution into hot water. The white precipitate was dried in vacuo at 50° C. The yield of resin was 11.5 grams. The analysis for nitrogen gave 4.70 per cent by weight as compared with calculated theory of 4.66 per cent, indicating by this result that a substantially pure copolymer in the ratio of one mole of isopropenyl acetate to one mole of N-butyl ethyl fumaramate had been obtained.

*Example 3.—Copolymer of isopropenyl acetate and N-diethyl ethyl fumaramate*

10.0 grams of isopropenyl acetate, 19.9 grams of N-diethyl ethyl fumaramate and 0.15 gram of benzoyl peroxide were sealed together in a glass tube and placed in a 50° C. bath. After heating in the bath at this temperature for a period of 30 days, the contents of the tube had changed to a viscous, light brown colored liquid. This was diluted with acetone, filtered and the solution poured into boiling hydrocarbon fraction having a boiling range of 105° to 156° F. The precipitate obtained was redissolved and reprecipitated as above. It was then dried in vacuo at 50° C. Analysis of the resin gave a nitrogen content slightly greater than the theoretical of 4.66 per cent by weight, indicating thereby that the resin obtained was substantially a copolymer in the ratio of one molecular weight of isopropenyl acetate to one molecular weight of N-diethyl ethyl fumaramate.

*Example 4.—Copolymer of isopropenyl acetate and ethyl maleamate*

5 parts by weight of isopropenyl acetate, 72 parts by weight of ethyl maleamate, 0.06 part by weight of benzoyl peroxide and 10 parts by volume of dry dioxane were placed in a glass ampoule and sealed. The ampoule was placed in a 50° C. constant temperature bath and agitated for a few minutes, until a clear, colorless solution formed, and allowed to stand in the bath for 24 hours. A clear, colorless, non-flowing mass was obtained. This was thinned by the addition of dioxane containing about 10 per cent of water, and the diluted solution poured into excess of agitated methanol. The white precipitate thus obtained was redissolved in a dioxane-water mixture and reprecipitated into methanol. The polymer was dried at 50° C. A yield of 11 parts by weight of the polymer was obtained. Analysis for nitrogen indicated that the molar ratio of isopropenyl acetate to ethyl maleamate in the copolymer was approximately 1:1.

In the above example, the ethyl maleamate was prepared by bubbling dry ammonia gas through a solution of 150 gms. of maleic anhydride in 3 liters of dry benzene which was kept cold in an ice bath. When no more ammonia appeared to be absorbed, the white precipitate which had formed was filtered off and dried. This product was dissolved in 3 liters of distilled water, filtered and to the filtrate 250 gms. of silver nitrate in 600 cc. of distilled water were added. In a few minutes, a voluminous white precipitate formed, which was filtered off by suction and dried at 55° C. Care was taken not to expose this silver salt to bright light. 100 gms. of the above silver salt were pulverized and then suspended in 300 cc. of dry benzene, and to the well stirred suspension 65 gms. of ethyl iodide were added. The mixture was heated under reflux on a steam bath for one-half hour and filtered while still hot. The filtrate, on cooling, precipitated long, slender needles. After separation and drying, the crystals were recrystallized from a mixture of equal parts of benzene and petroleum ether, decolorizing with charcoal at the same time. The purified, white, silky needles had a melting point of 95° C. The yield was about 25 grams. Analysis of the product gave by weight 50.28 per cent carbon, 6.35 per cent hydrogen and 9.68 per cent nitrogen compared with calculated theory of 50.34 per cent, 6.34 per cent and 9.78 per cent, respectively. This indicated that a substantially pure ethyl maleamate had been obtained.

Although in each of the above examples only a single ester-amide is copolymerized with isopropenyl acetate, it will be understood that more than one ester-amide of fumaric acid, more than one ester-amide of maleic acid can be copolymerized with isopropenyl acetate, or, an ester-amide of fumaric acid and an ester-amide of maleic acid can be copolymerized with isopropenyl acetate simultaneously. Other ester-amides than those illustrated in the examples also are contemplated in the invention. In addition to the ester-amides already mentioned, there may be employed equivalent amounts in the above examples of the methyl, propyl, butyl, allyl, $\beta$-chloroethyl or $\beta$-ethoxyethyl fumaramates and corresponding maleamates, and the N-alkyl derivatives such as N-methyl, N,N-dimethyl, N-ethyl, N,N-diethyl, N-propyl, N,N-dipropyl, N-butyl, N,N-dibutyl, N-allyl, N,N-diallyl, N-$\beta$-chloroethyl, N,N-di-$\beta$-chloroethyl, N-$\beta$-ethoxyethyl, N,N-di-$\beta$-ethoxyethyl of the above-mentioned fumaramates and maleamates.

The various ester-amides of fumaric acid can be prepared from the acid monoester chlorides by reacting the chlorides with ammonia or with the desired alkylamine, by condensing the monoamide chloride with the desired monohydric alcohol or by methods described in "Beilsteins Handbuch der Organischen Chemie," 4th edition, vol. 2, page 743; vol. 4, page 63; and vol. 12, page 305.

A number of the ester-amides of maleic acid can also be prepared by the method described in Example 4 wherein ethyl maleamate is obtained from the reaction of gaseous ammonia with maleic anhydride.

What we claim is:

1. A copolymer of isopropenyl acetate and an ester-amide selected from the group consisting of

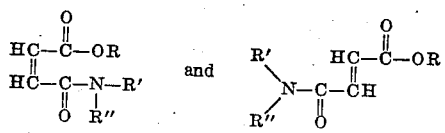

wherein R represents a member selected from the group consisting of a radical of a saturated monohydric aliphatic alcohol containing from 1 to 4 carbon atoms and a radical of a monohydric olefinic alcohol containing from 1 to 4 carbon atoms, and R' and R'' each represents a member selected from the group consisting of hydrogen, a radical of a saturated monohydric aliphatic alcohol containing from 1 to 4 carbon atoms and a radical of a monohydric olefinic alcohol containing from 1 to 4 carbon atoms, the molar ratio of isopropenyl acetate to said ester-amide in said copolymer being 1:1.

2. A process for preparing a 1:1 copolymer of isopropenyl acetate and an ester-amide selected from the group consisting of

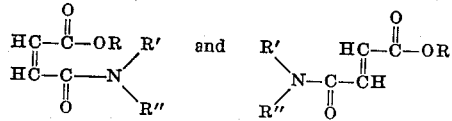

wherein R represents a member selected from the group consisting of a radical of a saturated monohydric aliphatic alcohol containing from 1 to 4 carbon atoms and a radical of a monohydric olefinic alcohol containing from 1 to 4 carbon atoms, and R' and R'' each represents a member selected from the group consisting of hydrogen, a radical of a saturated monohydric aliphatic alcohol containing from 1 to 4 carbon atoms and a radical of a monohydric olefinic alcohol containing from 1 to 4 carbon atoms, which comprises heating a mixture of from 1 to 3 parts by weight of isopropenyl acetate and 1 part by weight of the said ester-amide, in the presence of a polymerization catalyst.

3. A copolymer of isopropenyl acetate and N-butyl ethyl fumaramate in which the molar ratio of isopropenyl acetate to N-butyl ethyl fumaramate is 1:1.

4. A copolymer of isopropenyl acetate and N-diethyl ethyl fumaramate in which the molar ratio of isopropenyl acetate to N-diethyl ethyl fumaramate is 1:1.

5. A copolymer of isopropenyl acetate and ethyl maleamate in which the molar ratio of isopropenyl to ethyl maleamate is 1:1.

6. A process for preparing a 1:1 copolymer of isopropenyl acetate and N-butyl ethyl fumaramate, which comprises heating a mixture of from 1 to 3 parts by weight of isopropenyl acetate and 1 part by weight of N-butyl ethyl fumaramate, in the presence of a polymerization catalyst.

7. A process for preparing a 1:1 copolymer of isopropenyl acetate and N-diethyl ethyl fumaramate, which comprises heating a mixture of from 1 to 3 parts by weight of isopropenyl acetate and 1 part by weight of N-diethyl ethyl fumaramate, in the presence of a polymerization catalyst.

8. A process for preparing a 1:1 copolymer of isopropenyl acetate and ethyl maleamate, which comprises heating a mixture of from 1 to 3 parts by weight of isopropenyl acetate and 1 part by weight of ethyl maleamate, in the presence of a polymerization catalyst.

WILLIAM O. KENYON.
CORNELIUS C. UNRUH.

No references cited.